April 4, 1961  J. W. CRANE ET AL  2,977,873
HARVESTER
Filed May 15, 1959  3 Sheets-Sheet 1
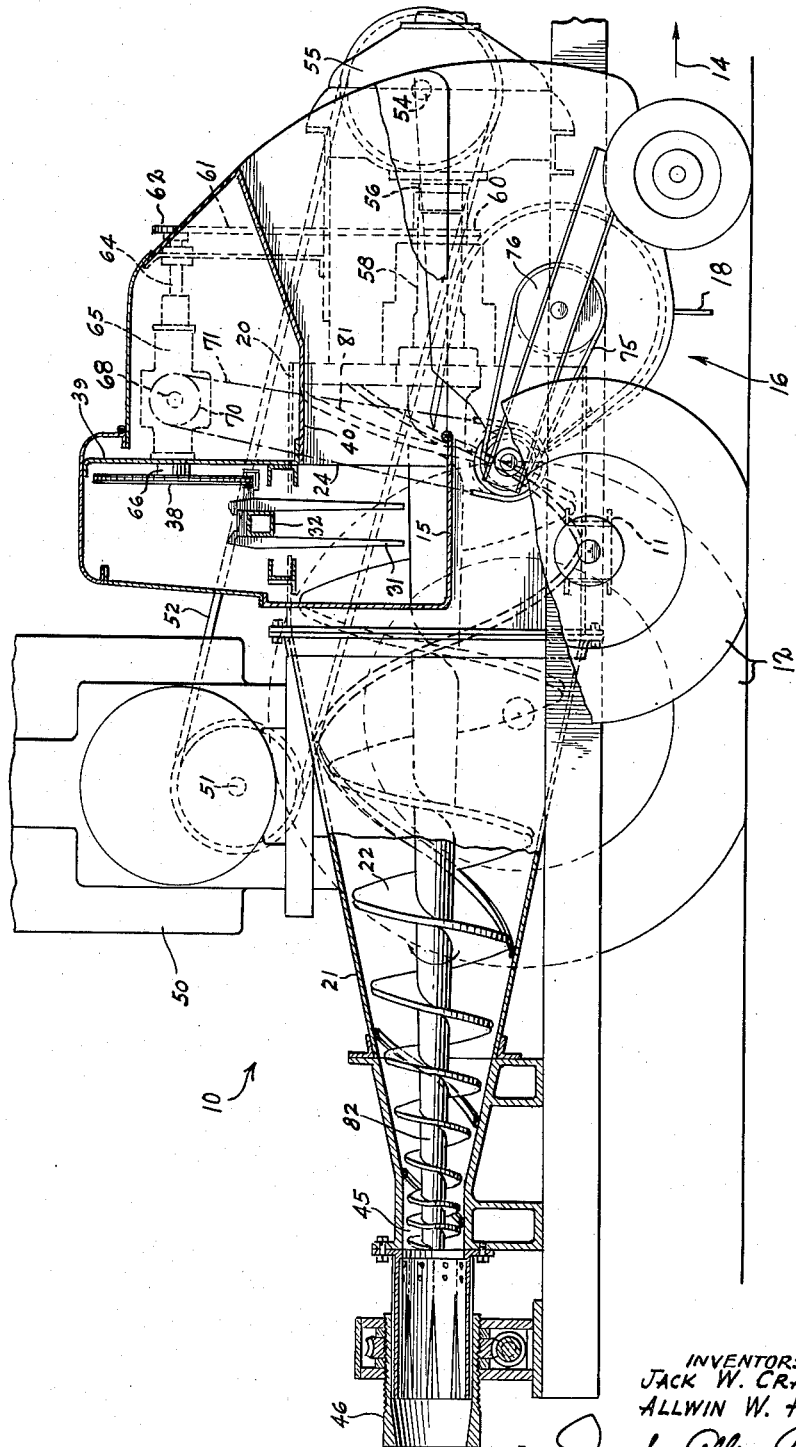
INVENTORS
JACK W. CRANE AND
ALLWIN W. PELLETT
By Joseph Allen Brown
ATTORNEY

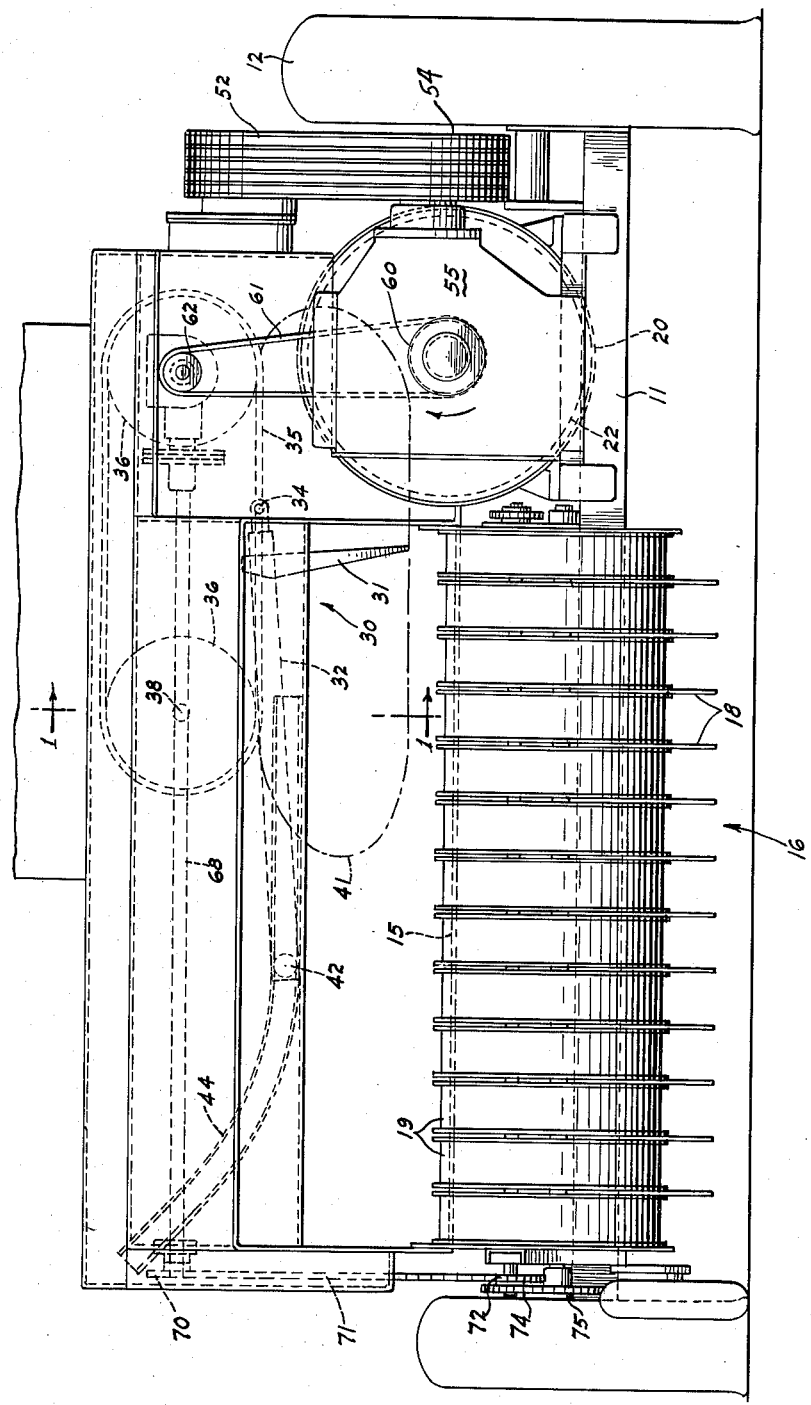

April 4, 1961 J. W. CRANE ET AL 2,977,873
HARVESTER
Filed May 15, 1959 3 Sheets-Sheet 3
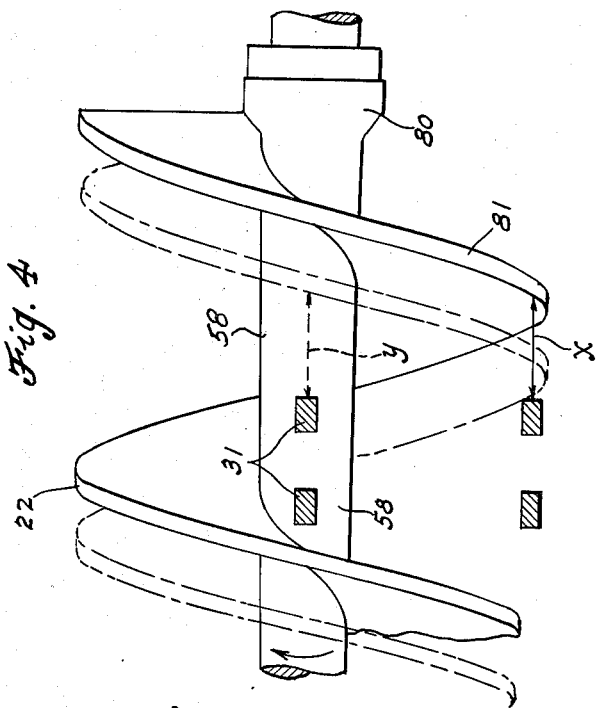
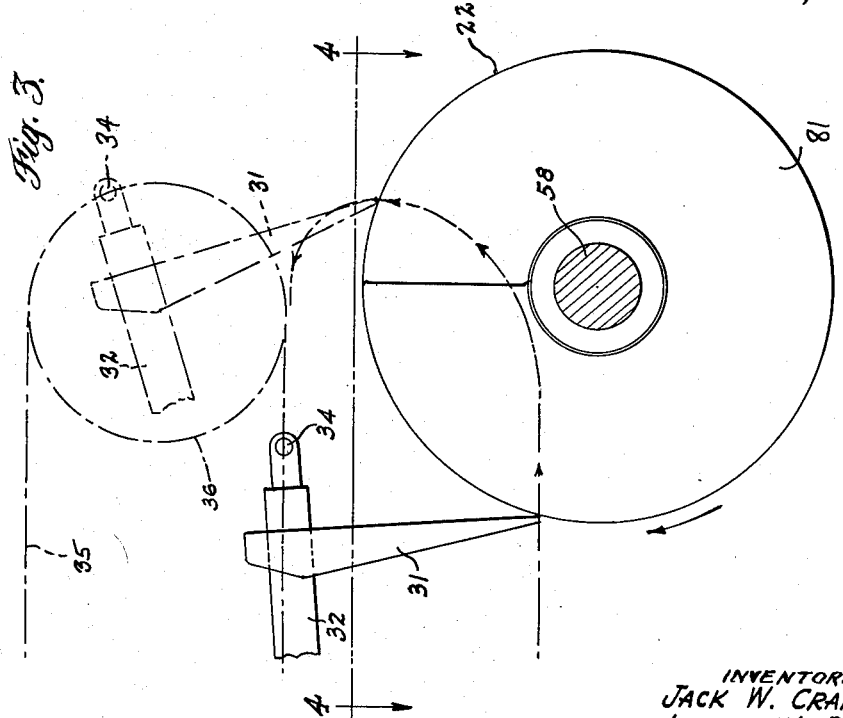
INVENTORS.
JACK W. CRANE AND
ALLWIN W. PELLETT
By Joseph Allen Brown
ATTORNEY

United States Patent Office 2,977,873
Patented Apr. 4, 1961

2,977,873

HARVESTER

Jack W. Crane, New Holland, and Allwin W. Pellett, Honeybrook, Pa., assignors to Sperry Rand Corporation, New Holland, Pa., a corporation of Delaware Filed May 15, 1959, Ser. No. 813,516

4 Claims. (Cl. 100—142)

This invention relates to agricultural machines adapted to gather crop material from a field and form it into pellets. More particularly, the invention relates to feeding means for such a machine.

A common way to harvest hay is to use an automatic field hay baler. A baler picks up cut and windrowed crop material and conveys it into a bale chamber in separate charges which are compressed and formed into units a series of which produce a bale. Upon completion of each bale, it is banded with wire or twine and then discharged onto the ground or delivered to a trailing wagon. Even though a hay bale has considerable density, it has to be tied before it leaves the baler. Otherwise, the bale charges or slices will separate from each other when the bale is discharged. If crop material is compressed to a greater degree than used in baling, such as three or four times as much, the hay will bind together and will not have to be tied. It has been found, that even though material is compressed to an extent that it does not have to be secured with a tying medium, the compressed material can be given to animals as feed, the animals being able to break it apart and consume it.

One method of forming hay into pellets is to use a compression auger housed in a chamber and operable to reduce the volume of material conveyed by the auger as the material is moved axially. One problem with mechanisms of this type is to provide an effective means for delivering the crop material to be pelletized into the flights of the auger. Unchopped crop material is not readily "flowable." If conventional hay is deposited in a V-shaped hopper with a bottom opening, the hay will tend to bridge the opening. Positive means are required to convey it. When an auger is used to compress the hay, means must be employed to force the hay between successive auger flights.

A principal object of this invention is to provide suitable means for delivering crop material in successive charges to a pelleting auger.

Another object of this invention is to provide feeding means wherein crop material is deposited close to the shaft of the auger so that the flights are able to catch hold of and begin the conveyance of the material toward a pellet stage.

Another object of this invention is to provide feeding means which includes a mechanism which travels across the path of flights on a pelleting auger, the operation being designed however to preclude interference between the traveling mechanism and the auger.

A still further and most important object of this invention is to provide feeding means in which a feed member will deliver crop material to an auger and pass in front of a flight section thereon while continuously maintaining a given clearance with such flight section.

Other objects of this invention will be apparent hereinafter from the specification and from the recital in the appended claims.

In the drawings:

Fig. 1 is a longitudinal vertical section through a pelleting machine having feeding means constructed according to this invention, such section being taken generally on the line 1—1 of Fig. 2 and looking in the direction of the arrows;

Fig. 2 is a front view of Fig. 1;

Fig. 3 is an enlarged, fragmentary, generally diagrammatic side view illustrating the cooperative operation of the feeding means and the pelleting auger; and Fig. 4 is a plan view of Fig. 3 illustrating how the feed members of the feeding means are maintained at substantially a fixed distance from the auger flights as they pass across the auger.

Referring now to the drawings by numerals of reference, and first to Figs. 1 and 2, 10 denotes a pelleting machine having a frame 11 supported on ground wheels 12 for forward movement as indicated by the arrow 14 in Fig. 1. Mounted on frame 11 and extending transversely relative to the forward direction of travel of the machine is a feed platform 15 adapted to receive crop material delivered from a conventional pick-up 16 which includes tines or fingers 18 for engaging and elevating the crop material. Tines 18 operate between laterally spaced, fore-and-aft extending stripper members 19.

When viewed as shown in Fig. 1, pick-up 16 rotates counterclockwise.

Also mounted on frame 11 and extending fore-and-aft relative thereto is a housing 20 which includes a conical section 21 tapering from its forward to its rearward end. Rotatable in housing 20 is an auger 22 shaped to conform with the bore of the housing 20. Adjacent its forward end, housing 20 has an inlet opening 24 which exposes a portion of the forward end of auger 22 from the top and from the side facing platform 15.

Operable above platform 15 is feed or delivering means 30 comprising generally vertically extending feed members or fingers 31 carried on a transversely extending bar 32. Bar 32 is pivotally connected at 34 to an endless chain 35 which extends around a pair of laterally spaced sprockets 36. As shown in Fig. 2, one of these sprockets is located above housing 20 and the other sprocket is disposed above the end of platform 15 adjacent the housing. Sprockets 36 are carried on stub shafts 38 journaled in a vertical wall 39 (Fig. 1) supported on cross member 40 which provides a roof over the rear of the pick-up. When chain 35 is rotated, support bar 32 is reciprocated. The feeding fingers 31 travel in a path indicated by the dotted line 41, Fig. 2. The end of bar 32 remote from housing 20 has rollers 42 which operate in arcuate channels or guide tracks 44 to support the rearward end of the feeding mechanism.

The crop material picked up by the pick-up 16 is delivered rearwardly to the platform 15 whereupon feeding means 30 engages the material and conveys it in successive charges through the opening 24 in housing 20. The rotating auger 22 conveys the material rearwardly, compressing the material three or four times to one as it moves it toward a discharge opening 45 at the rear end of housing 20. Communicating with the discharge end 45 is an adjustable choke 46 adapted to receive the compressed crop material. Previously formed pellets are pushed from the choke 46 by material subsequently being discharged from the auger 22.

To operate the components of the machine, an engine 50 is provided. Such engine has an output shaft 51 connected through a series of endless belts 52 to the input shaft 54 of a gear box 55. The gear box 55 has an output shaft 56 connected to the shaft 58 of the auger 22 to thereby rotate the auger. Output shaft 56 includes a sprocket 60 connected through an endless chain 61 to a sprocket 62 keyed to the input shaft 64 of a suitably supported gear box 65. Gear box 65 has a first output shaft 66 connected to the sprocket 36 above the housing 20. Therefore, a drive is provided to the feed mechanism 30. The gear box 65 also has an output shaft 68 which extends completely across the machine to the outboard end thereof and operates through sprocket 70, chain 71, sprockets 72 and 74, chain 75 and sprocket 76 to drive the pick-up 16.

The above structure is recited merely to establish the environment of applicants' specific improvement which resides in the combination of the feeding means 30 with the auger 22.

As shown in Fig. 4, the auger 22 has adjacent its forward end 80 a forward flight section 81, three hundred and sixty degrees in extent. When the auger rotates, as indicated by the arrow in Fig. 4, the flights on the auger convey material from the forward end 80 toward the rearward end 82 of the auger (Fig. 1). As shown in Figs. 3 and 4, the pairs of feed fingers 31 sweep toward the shaft 58 of the auger and then are extracted upwardly. The fingers pass between successive flights on the auger and in front of the forward flight 81. Nevertheless, interference is precluded between the feed mechanism and he auger flights as shown in Fig. 4. When the feed fingers first pass across the path of movement of the flight 81, the fingers are spaced from flight 81 a distance indicated by the arrow X. When the fingers have moved to the shaft 58, the auger has made approximately one-fourth of a revolution and flight 81 is now in the dotted position. It will be noted that the fingers 31 are still the same distance from the flight 81, namely the distance Y. The feeding means, which operates transversely relative to the axis of the auger 22, moves laterally at a rate related to the rotation of the auger whereby the fingers assume a central position between successive auger flights and maintain a given distance or clearance between such flights as they move into then out of the path of flight 81.

The sweeping action of the feed fingers directly toward the shaft of the auger provides a positive, forceful feed of the material into the housing 20 and in between the flights of the auger so that the material may then be fed rearwardly to the conical section 21. This feeding action subtantially increases the capacity of the machine by getting more material into the auger with each working stroke of the feed means. By properly relating the feed means to the auger flights a consistent and positive transfer of material from platform 15 to the auger is accomplished.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. In combination, an auger rotatable about its longitudinal axis and operable to convey material from a forward end to a rearward end thereof, said auger comprising a shaft and helical flights including a forward flight section, means for delivering material toward said auger shaft and on the side of said forward flight section toward said rearward end of the auger, said delivering means including a feed member operable in a plane perpendicular to said auger shaft and means moving the member into then out of the path of movement of said forward flight section, there being a given clearance space between said member and said flight section where the member first intersects said path of movement, and drive means rotating said auger and moving said delivering means in fixed timed relation whereby said given clearance space between said feed member and said flight section remains substantially constant as the feed member travels across said path of movement.

2. In combination, a generally horizontally extending auger rotatable about its longitudinal axis and operable to convey material from a forward end to a rearward end thereof, said auger comprising a shaft and helical flights including a forward flight section, means operable in a plane perpendicular to said axis for delivering material toward said auger shaft on the side of said forward flight section toward said rearward end of said auger, said delivery means including a generally vertically extending feed member and means moving said member, while maintaining its vertical extension, toward said auger shaft, across the path of movement of said forward flight section and upon reaching a position over said auger shaft then upwardly and out of said path, there being a given clearance space between said member and said flight section where the member first intersects said path of movement, and drive means rotating said auger and moving said delivering means in fixed timed relation whereby said given clearance space between said feed member and said flight section remains substantially constant as the feed member travels across said path of movement.

3. In combination, a generally horizontally extending auger rotatable about its longitudinal axis and operable to convey material from a forward end to a rearward end thereof said auger comprising a shaft and helical flights including a forward flight section, a housing surrounding said auger, said housing having an inlet opening registering with said forward flight section and exposing said flight section from the top and from one lateral side, at least, means operable in a plane perpendicular to said axis for delivering material through said opening and then toward said auger shaft on the side of said forward flight section toward said rearward end of said auger, said delivery means including a feed member and means moving the member across the path of movement of said forward flight section from the side and then extracting the feed member by moving it upwardly through the top of said opening, there being a given clearance space between said member and said flight section where the member first intersects said path of movement, and drive means rotating said auger and moving said delivering means in fixed timed relation whereby said given clearance space between said feed member and said flight section remains substantially constant as the feed member travels across said path of movement.

4. In combination, a generally horizontally extending auger rotatable about its longitudinal axis and operable to convey material from a forward end to a rearward end thereof, said auger comprising a shaft and helical flights including a forward flight section, a housing surrounding said auger, said housing having an inlet opening registering with said flight section and exposing the flight section from the top and one lateral side, a feed platform extending from said one lateral side and in a horizontal plane intersecting said auger shaft, means operable in a plane perpendicular to said auger axis for delivering material through said opening and then toward said auger shaft on the side of said forward flight section toward said rearward end of the auger, said delivering means including a feed finger and means for sweeping said finger over said platform, through said opening, across the path of movement of said forward flight section and then extracting the feed member upwardly, there being a given clearance space between said member and said flight section where the member first intersects said path of movement, and drive means rotating said auger and moving said delivering means in fixed time relation whereby said given clearance space between said feed finger and said flight section remain substantially constant as the feed member travels across said path of movement.

References Cited in the file of this patent
UNITED STATES PATENTS
1,045,184    Randleman _____ Nov. 26, 1912